Sept. 8, 1953   P. C. TALMADGE ET AL   2,651,748
ELECTRICAL OVERLOAD PROTECTOR
Filed Oct. 26, 1950
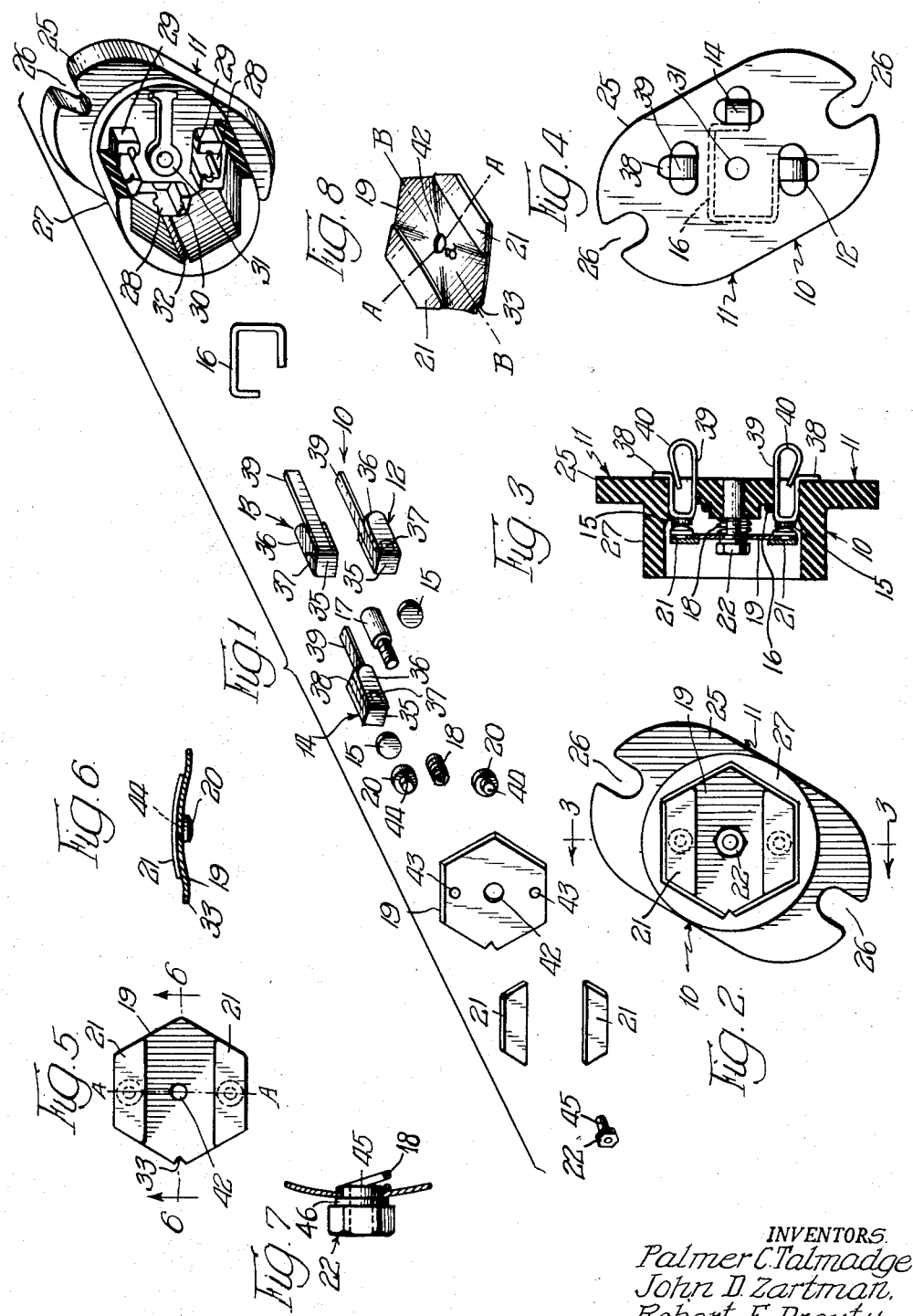
INVENTORS.
Palmer C. Talmadge,
John D. Zartman,
Robert E. Prouty,
By Patented Sept. 8, 1953

2,651,748

UNITED STATES PATENT OFFICE 2,651,748

ELECTRICAL OVERLOAD PROTECTOR

Palmer C. Talmadge, John D. Zartman, and Robert E. Prouty, Logansport, Ind., assignors to Essex Wire Corporation, Logansport, Ind., a corporation of Michigan Application October 26, 1950, Serial No. 192,278

8 Claims. (Cl. 318—453)

Our invention is directed to a new and improved overload protector for protecting electric devices from damage due to overloading and overheating of the windings.

More particularly our invention is directed to a new and useful bimetallic actuator construction especially adapted for use with our overload protector, with the herein presented application thereon constituting a continuation-in-part of our copending application, Serial No. 123,775, filed October 26, 1949, and bearing the title of Electrical Overload Protector, now Patent No. 2,587,789.

It is a well recognized principle among those familiar with the operation of electric devices, such as motors, that permanent and serious damage may be caused by the presence of excessive temperatures and currents in the windings. Among various devices employed to guard against these damaging conditions, control circuits and numerous thermally responsive devices have been utilized, including bimetallic switches of various designs. However, the difficulty of maintaining proper calibration of the bimetal element to provide a uniform and proper "snap" in the switching action has proven a serious detriment in the past.

It is a primary object of this invention to provide a new, improved and simplified overload protective device capable of automatically resetting itself to protect the windings of a motor from excessive currents and temperatures.

It is one of the objects of this invention to provide a new and improved construction of a bimetallic actuator for an overload protector capable of maintaining its calibrated radius of curvature during repeated switching action.

It is another object of this invention to provide a new and simplified manner of adjusting the opening temperature of the bimetal switch of the overload protector unit.

It is a further object of this invention to provide a new and improved bimetallic overload protective device adapted to substantially eliminate contact flutter and intermittent circuit operation of the switching element thereof.

It is a further object of this invention to provide an overload protector having a simple and new terminal connector which will prevent solder from flooding the interior of the protective unit when connecting it to the motor leads or in circuit with other types of electrical devices.

These and other objects will appear from the following detailed description.

Now, in order to acquaint those skilled in the art with the manner of constructing and utilizing a device in accordance with the principles of our invention, a description of a preferred embodiment thereof shall be made with reference to the accompanying drawings wherein:

Figure 1 is an exploded projection drawing showing the relationship and arrangement of the various parts of an overload protective unit embodying our invention;

Figure 2 is a plan view of the assembled unit;

Figure 3 is a cross-sectional view taken along line 3—3 of Figure 2;

Figure 4 is a bottom view of the unit shown in Figure 2;

Figure 5 is an enlarged detailed plan view of the bimetallic switch blade assembly;

Figure 6 is a detailed cross-sectional view taken along the line 6—6 of Figure 5;

Figure 7 is a detailed side elevation of the adjusting nut used to regulate the opening temperature of the protector; and Figure 8 is a perspective view of our bimetal blade in its circuit open or thermally actuated position showing the curvilinear configuration assumed thereby.

This invention may be best understood with reference to the exploded projection of Figure 1 which shows a protector unit 10 comprising a base 11 in which may be assembled three post terminals 12, 13 and 14, a pair of cylindrical contact points 15, a heater element 16, a centrally disposed adjusting post 17, a tensioning coil spring 18, an operating bimetal blade 19, a pair of contact buttons 20, 20, a pair of segmental curvature reinforcing plates 21, 21, and an adjusting nut 22.

The base may be of any suitable insulating material, such as "Bakelite," and may be of any convenient compact shape or size, depending on the requirements of use. As shown in Figures 1, 2, 3 and 4, the base has a substantially oval shaped foundation plate 25 fitted with suitable fastening slots 26, 26 for mounting the unit to a stationary mounting, such as a motor frame or shell, by means of screws or similar fasteners. A centrally disposed cylindrical cup 27 may be formed integrally with the foundation plate to extend outwardly from the top surface thereof to form a suitable receptacle or housing for receiving and protecting the various parts of the assembled unit. As shown herein, the interior profile of the cup 27 is hexagonal in shape for convenience, but may be of other desired polygonal shape, or circular. Three square apertures 28 may be formed in the foundation plate for receiving one end of the terminals 12, 13 and 14 in assembly. Three reinforcing projections 29 may be formed as part of the cup and foundation plate to lie within the interior periphery of the cup in surrounding relation to the square apertures 28 for providing lateral strength and rigidity to the terminals and for positively locating the mounted terminals, as by means of female guide slot 30 formed therein. A centrally disposed circular hole 31 may be provided in the foundation plate 25 to receive a knurled end of the adjusting post 17, adapted to be press fitted therein. If desired, a guiding bead 32 may be provided, preferably at one of the apexual corners of the cup's interior, to provide positive locating means for the assembled bimetal blade 19, as will appear more clearly hereinafter.

The post terminals 12, 13 and 14 may be of any suitable conducting metal, and, as shown herein in Figure 1, each comprises a top surface 35, side lugs 36, 36 with male locking projections 37 extending therefrom, a back lug 38 and an elongated front lug 39. All the lugs may be rectangular in shape and folded at right angles to the top surface of the terminal to form an open cornered box effect. As seen in Figures 3 and 4, the four lugs project through the foundation plate with the side and back lugs being turned over to meet the bottom surface of the foundation plate in assembly, while the front lug is looped back toward itself and forced inside the back lug to form a solder terminal 40 for receiving a circuit connector (not shown). It should be noted that when the three terminals are thusly mounted in the foundation plate with their head ends approximately encased by the reinforcing projections 29 in the bottom of the cup 27, a terminal assembly is provided which will prevent solder from flooding the interior of the protective unit when connecting the motor leads or circuit connectors to the solder terminals projecting from the bottom surface of the foundation plate.

The cylindrical contact points 15 are adapted to be fastened to the top surface of two of the terminals 12 and 14, as by welding or brazing, and are preferably made of silver to insure good electrical contact with the contact buttons 20. Having been so fitted with the contacts 15, as described above, the two terminals 12 and 14 will extend further up into the cup interior in assembly than the third terminal 13 to thereby contact the buttons 20 mounted to the underside of the bimetal blade 19 when the blade is in closed position in the cup.

The heater element 16 is herein shown as comprising a wire of a suitable material, such as Nichrome steel, responsive to heating by current flow of electricity and bent to any desired shape, although herein again for convenience, a substantially rectangularly bent form, open at one corner, is preferred. In assembly, the wire heater is fastened, as by welding or soldering, to the terminal 13 and to either one of the two capped terminals 12 or 14, to lie near the bottom of the cup 27, as shown in Figures 3 and 4.

The adjusting post 17 may be a cylindrical rod, as shown herein, threaded on one end and knurled on the remainder of its cylindrical surface. In assembly, the knurled end of the post is pressed into the circular hole 31 disposed centrally in the bottom of the base cup 27 to extend through the foundation plate. The receiving hole 31 in foundation plate 25 is desirably of smaller diameter than the diameter of the knurled portion of the adjusting post.

The tension coil spring 18 is adapted to surround the threaded end of the adjusting post, mounted in the base, as described above, so as to provide a resilient pressure against the bottom surface of the bimetal blade 19 in final assembly, for holding the bimetal blade snugly against the bottom of the adjusting nut to thus prevent the loss of any contact gap between blade and terminals 12 and 13 when the blade is in open circuit position.

The bimetal blade 19 is the operating element of the protector unit and is shown herein in Figures 5 and 6 as a hexagonal bimetallic disc composed of two layers of metal having unlike coefficients of thermal expansion, as is well known to those skilled in the art. One corner of the hexagon disc, if desired, may be provided with a notched corner 33 to receive loosely the optional guide bead 32 of the base cup 27 for positively locating the bimetal blade in its proper assembled position on the adjusting post. A cylindrical hole 42 is provided at the center of the blade for receiving the threaded end of the adjusting post and the inner end of the adjusting nut therethrough. Suitable openings 43, 43 herein shown as single, circular apertures, may be provided along two opposite margins of the hexagonal blade for receiving the upper ends of the contact buttons 20 therethrough.

The contact buttons 20 are herein shown as short, metal cylinders, and may have a nickel-plated steel backing and a silver contact surface to insure good electrical contact and rigidity. The hard, metal backing of the contact buttons is herein provided with a small cylindrical boss 44 projecting therefrom, adapted to be inserted through one of the holes 43 in the bimetal blade 19 for connection with one of the curvature reinforcing plates 21, as will appear hereinafter.

The curvature reinforcing plates 21, as shown herein, may be trapezoidal in shape to conform to the peripheral contour of the bimetal blade 19 to which they are fitted. Before final assembly, the plates 21 are welded to the contact button boss projections 44 which extend upwardly from the bottom surface of the blade through the receiving holes 43 placed in the blade margin for that purpose. Both the blade 19 and plates 21 are flat until after the plates and button contacts are welded together to grip the blade margin firmly therebetween.

Thus, united as a unit or sub-assembly, the blade 19 and attached segmental curvature plates may be formed on a cylinder of predetermined radius to bend the sub-assembly into a curved cylindrical segment, as shown in Figure 6, and thus obtain the desired operating characteristics for the bimetal blade dictated by the radius, as will appear more fully hereinafter under the operational description. The segmental plates 21 may be either of bimetal like the blade 19 or of some other metallic composition, such as nickel silver capable of current conduction and fusion with the contact buttons 20, but of sufficient thickness and rigidity to maintain their radius of curvature against aging and creepage of the metallic composition thereof. In this connection it is important to recognize that while the segmental plates 21 are permanently deformed and stressed beyond their elastic limit so as to be imbued with a permanent set curvature, the bimetal blade itself remains in an unstressed condition with no deformation or permanent set beyond its elastic limit taking place in the formation of the blade assembly. Thus there is no danger of creepage or age effect in the blade itself which would result in a loss of calibration during operation. While it is true that the elastic limit of the segmental plate material is exceeded in giving these plates a permanent set curvature, the danger of calibration loss due to aging and creepage thereof is relatively remote because of their rather heavy mass and weighty character. By this construction we have found that blades made in accordance with this novel principle maintain their calibration long after other blades of presently known types have failed and lost their calibration. Thus, it should be noted that by the simple expedient of using reinforcing curvature plates of sufficient strength and thickness to resist creepage and aging, the calibrated radius of curvature formed in the blade is permanently assured, and the actuating element or blade itself will not be allowed to flatten out, due to metal aging and creepage to thereby lose its calibrated radius because the blade is never stressed beyond its elastic limit to take on a permanent set curvature. If both the plates 21 and blade 19 are of bimetal, the operational characteristics of the bimetal unit will change, depending on the acting sense of the radius of curvature of the bimetal plate, as will be explained hereinafter under use and operation.

The adjusting nut 22, as shown in detail in Figure 7, may have a hexagonal head and is adapted to thread onto the threaded end of the adjusting post 17 to adjust the compression of the spring 18 and to hold the blade in its final assembled position on the adjusting post. It should be noted that the bottom portion of the nut is provided with a cylindrical bottom end 45 adapted to fit through the central circular hole 42 in the bimetal blade, and of slightly smaller diameter than the inside diameter of the tension spring 18, so that it may conveniently fit inside the upper end of the spring to maintain it in a properly centered position around the adjusting post 17. An additional cylindrical portion 46 of larger diameter than the bottom end 45 is provided to present a shoulder to the top surface of the blade 19 to press thereagainst as the nut is threaded downwardly on the post to compress the spring 18.

*Use, adjustment and operation*

Having thus described the various individual parts of the protector unit, it will be seen that a simple and compact protector has been provided which is thermally responsive to excessive current or temperatures in the windings of an electrical circuit or device. In its usual application, a unit such as this preferably would be mounted inside or outside the housing of the electrical device to be protected in such a manner that the bimetallic actuating blade would operate in an ambient temperature proportional to the temperature of the windings of the electrical device or motor. The device could also be used as a thermostatic control in an electrical wiring circuit or the like. For convenience, its use with an electrical motor shall be described. Usually the blade and heater will be connected in series with the motor windings, using two of the three terminals of the unit. If a dual voltage motor be employed, then all three terminals are used. Since the bimetallic element automatically resets itself, it will continue to open circuit so long as abnormal conditions continue, that is, if there is excessive current flow, or the winding temperature is abnormally high, or if both conditions exist simultaneously.

A device of this type usually has three operating characteristics of importance; the first being the temperature at which the unit will open the circuit to be protected, the second being the temperature at which the unit will close the circuit, and the third being the operating time characteristics of the unit at a given temperature. All three of these characteristics of the protector are regulatory in the unit and their values largely specified by three external factors.

The opening temperature is generally determined by the relative positions of the protector unit and the actuating "hot spot" of the motor windings, the relative distance between the two giving rise to a temperature gradient. The temperature differential of the protector, or difference between opening and closing temperature, is largely dependent on the thermal characteristics of the motor, which keeps the cycling rate of the protector from becoming excessive, which would cause undue heating of the heater element. The required time characteristics of the protector at room temperatures are largely dictated by the maximum allowable time it takes for the motor winding temperature to become excessive when current is passed through the motor in locked position.

Adjustment of the protector's opening temperature is accomplished in final assembly by tightening or loosening the adjusting nut 22 on the adjusting post 17. Briefly, for a given radius of blade curvature, an increase in the center restraint on the blade will decrease the opening temperature, and, conversely. The protector closing temperature is fixed by the blade assembly and is not adjustable after the protector unit is complete. All other conditions being constant, shortening of the radius of curvature of the blade assembly will increase the closing temperature, and conversely. The time current characteristic of the protector unit may be varied by changing the resistance of the heater element 16 which is connected in series electrically with the blade through terminals 12 and 14 and the contacting buttons 20 resting on terminals 12 and 13 when the blade is in a closed circuit position.

It should be noted that, by mounting the blade assembly in the cup by means of an adjusting nut and spring, substantially all contact flutter and intermittent circuit operation is eliminated. Most disc type bimetallic thermostatic units of this type presently employed are provided with a loose fit between the under side of the bimetal element and a lower restraining shoulder, with a snug fit between the upper surface of the bimetal element and an upper restraining shoulder. As the bimetal element heats up, the contact pressure is decreased, due to flattening of the bimetal blade. If the temperature increases through the critical range slowly, the top surface of the bimetal element draws away from the upper restraining shoulder and the blade rests on the lower shoulder. When this occurs, the contact pressure of the blade on the contacts is practically zero and intermittent contact and flutter of the blade takes place. The nut and spring means used in this invention avoid these undesirous results by providing a snug fit on both sides of the bimetallic element.

In forming the bimetallic element in the shape of a segment of a cylindrical surface with the high, expansive side of the bimetal on the inside of the blade radius, as shown herein, certain mechanical stresses are imposed on the blade by its curved or bent configuration which are opposed by other thermal stresses when heat is applied to the blade. When the heat is sufficiently intense, so that the thermal stresses exceed the mechanical stresses in the bent blade, the blade assembly snaps open. Conversely, when the blade is again cooled, the mechanical stresses exceed the now inactive thermal stresses and the blade snaps shut to a closed position, so that the contact buttons 20 rest in contact with the two capped terminals 12 and 13.

As previously noted, the reinforcing curvature plates 21, which carry the desired radius of curvature determining the operational calibration of the blade, may be made of bimetal. If such a construction be employed, and the radius of curvature lengthens as the ambient temperature increases, the protector will require less current to operate at higher temperatures. Such a protector would be particularly useful if it were desired to have the operating current inversely proportional to the ambient temperatures. Conversely, if bimetal blades and plates were assembled so that the radius of curvature of the blade shortens with an increase of ambient temperature, the protector would require greater current to operate as the temperature increases. Such a protector would then be applicable if it were desired to have the operating temperature directly proportional to the ambient temperature of the unit.

In considering the operation of the above described bimetallic blade actuator 19, it is helpful to contemplate the various operating curved formations assumed by that blade whereby a quick snap action thereof is gained. As will be recognized Figures 5, 6 and 8 of the drawings, in particular Figure 8, the imposition of the calibrated radius of curvature by the curved segmental reinforcing plates 21 causes the non-permanently deformed blade 19 to assume a downwardly bowed shape approximating that of a segment of a cylindrical surface. This may best be seen in Figure 6 of the drawings. This means that in the blade's non-thermally actuated, or its closed circuit position as recited herein, the central axis of the blade's curvature lies along a single imaginary line passing centrally through opening 42 and contact buttons 20, 20 thereof; this axis being designated A—A in Figure 5. In its actuated or open circuit position, however, the blade contains three distinct curved areas and three corresponding axes of curvature. Two of these areas lie immediately adjacent the reinforcing plates 21 and bear the curved configuration of the original closed circuit curved shape of the blade of which they each comprise a part of. The central axis for these two curved areas are shown as the two angularly intersecting imaginary lines A—a of Figure 8. The third curved area lies centrally of the blade and reaches transversely thereacross; its curved direction being in an opposite sense to the other two curved areas which are imposed by the plates 21. This third area is of a segmental cylindrical nature and has a central axis, designated B—B in Figure 8, which lies in right angular relation to the two converging axes A—a as well as the original axis A—A. Upon a cessation of the thermal stresses in the blade it returns to its normal closed circuit position to assume a single curved or bowed condition bearing the original calibrated radius of curvature as maintained by the inflexible plates 21.

While we have herein shown and described one form in which the principles of our invention may appear, it will be readily understood that numerous changes, modifications and substitutions of equivalents may be used without departing from the spirit and scope of this invention, and, therefore, we do not wish to be limited to the specific embodiments illustrated herein, except as may appear in the following appended claims.

We claim:

1. In a thermally responsive electrical overload protector, a base comprising a foundation plate and a cup projecting therefrom; a thermally actuated bimetal switch blade comprising two thin layers of different metals fused together as a single plate and having unequal thermal coefficients of expansion to form thereby opposed high and low expansive surfaces of said blade, said plate being mounted in said cup, two current carrying metal contact buttons inserted along opposite margins of said blade for contacting circuit connecting terminals mounted therebelow in said foundation plate, two metal contour reinforcing plates mountable on the upper surface of said blade and having fused connection with extended portions of said contact buttons projecting up through said blade and said contour plate being formed with a predetermined and calibrated radius of curvature which radius is imparted to and maintained in said blade by said contour plates, such plates being of sufficient thickness and rigidity to insure against aging and creepage of the metal of said blade caused by repeated flexing thereof.

2. In a thermally responsive electrical overload protector adapted to be connected in a protective circuit, a thermally responsive bimetallic switching blade, having opposite surfaces of unlike thermal expansive characteristics and being formed as a segmental portion of a cylindrical surface of predetermined radius of curvature, said blade being adapted to reverse its radius of curvature with a snap action in response to thermal stresses impressed in said blade so that the center of the curvature circle of said given radius of curvature shifts its location from a point outside one face of said blade to a corresponding point opposite its other face, and reinforcing means mounted to one face of said blade, adjacent opposite marginal edges thereof for maintaining said predetermined radius of curvature along such opposite margins during the reversal of said radius by said blade snap action, whereby said blade is insured a return to its calibrated radius of curvature when said thermal stresses are dissipated.

3. For use in a thermally responsive electrical overload protector, a thermally responsive actuating member comprising a thin flexible blade composed of two fused together thin layers of metal having unlike thermal expansive characteristics, said blade being adapted for convex flexing of its edges toward its low expansive side in the presence of a predetermined operating temperature supplied by an electrical heater, and a pair of rigid reinforcing metal plates rigidly secured to one surface of said blade adjacent opposite margins thereof, said plates being stressed beyond their elastic limit during the formation thereon of a predetermined calibrated curvature, said curvature being imposed and maintained transversely on said blade by virtue of said rigid connection of said plates therewith, with the curvature thus imbued to said blade failing to stress the metal thereof beyond its elastic limit whereby age and creep effect are eliminated from said blade and there is no reduction of calibrated curvature thereof due to its repeated operational flexing.

4. The actuating blade member as set forth in claim 3 wherein both said blade and reinforcing plates are of like bimetal with the high expansive side of said plates being mounted adjacent the low expansive side of said blade in assembly so that said plates cooperate with said blade to increase the latter's calibrated radius of curvature as its ambient temperature increases, whereby said blade is adapted for actuation by electrical currents flowing through the heater which are inversely proportional to increase in said blade's atmospheric ambient temperature.

5. The actuating blade member as set forth in claim 3 wherein both said blade and reinforcing plates are of like bimetal with the low expansive side of said plates arranged adjacent the low expansive side of said blade in assembly so that said plates act to decrease the calibrated radius of curvature of said blade as ambient temperature increases whereby said blade is adapted for actuation by electrical current flow through the heater which is directly proportional to increases in said blade's atmospheric ambient temperature.

6. A non-prestressed bimetallic actuator for use with an electrical overload protective device, comprising a disc composed of two thin layers of fused together unstressed metal having unlike thermal expansion characteristics, and a pair of rigid metal reinforcing plates formed with a permanent calibrated transverse curvature rigidly fastened to one surface of said disc and adjacent opposite margins thereof, whereby said unstressed disc is imbued with said curvature of said plates to form a single transverse non-thermally actuated curvature therein, said disc under thermal stress, flexing convexly toward its low expansive side to give said actuator a first thermally actuated curvature having a central axis lying normal to the central axis of said single non-thermally actuated curvature, with said two plates maintaining their permanent calibrated curvature during said thermal stressing of said disc whereby said actuator also contains second and third thermally actuated curvatures comprising separated portions of said single non-thermally actuated blade curvature lying adjacent said two plates.

7. In a thermally actuated electrical overload protector of the class described, the combination comprising, an insulating base member having a foundation plate and a cup portion projecting outwardly therefrom, a plurality of circuit connective terminals mounted in said plate and extending into said cup's interior, an electrical heater disposed in the bottom of said cup, a threaded adjusting post mounted centrally upright in said cup portion, a coil spring member mounted coaxially about said post, a curvilinear bimetallic switching blade mounted coaxially on said post and above said spring, said blade making contact with two of said terminals in its normally closed operating position and being adapted to snap upwardly adjacent its periphery toward its low expansive side to assume an open circuit position in the presence of a predetermined opening temperature; and an adjusting nut threaded over the upper end of said post for holding the center of said blade tightly against the upper end of said spring; said spring and nut maintaining the center of said blade stationary during operation, with said spring and nut providing a means for adjustably positioning the center of said blade on said post thereby to regulate the operating characteristics of said blade; movement of said nut to increase the compression of said spring causing an adjustable decrease in the temperature at which said blade will snap to its said open position.

8. In a thermally actuated motor overload protector for protecting the motor from excessive currents and temperatures, the combination comprising, a heater element in circuit with the motor and capable of exothermally activating said overload protector upon excessive current flow therethrough, a bimetallic switching blade in proximity with said heater and capable of snapping toward its low expansive side adjacent its periphery to open the circuit through the protector in the presence of a predetermined heat intensity, said blade being capable of automatically resetting itself to a closed circuit position upon cessation of said heat intensity, and means for restraining the center of said blade against movement during its operation and providing for the adjustment of said blade's opening temperature at selected values, comprising a fixed adjusting post projecting coaxially through the center of said blade, a compression coil spring mounted concentrically about said post and supported at its one end and having its opposite end bearing against one surface of said blade, and a nut member threadingly mounted on said post for holding the center of said blade snugly stationary against the adjacent end of said spring; threading adjustment of said nut to increase the compression of said spring serving to decrease the opening operating temperature for said blade.

PALMER C. TALMADGE.
JOHN D. ZARTMAN.
ROBERT E. PROUTY.

References Cited in the file of this patent

UNITED STATES PATENTS

| Number | Name | Date |
|---|---|---|
| 1,987,725 | Veinott | Jan. 15, 1935 |
| 2,041,775 | Mottlau | May 26, 1936 |
| 2,157,560 | Neece | May 9, 1939 |
| 2,189,996 | Riche | Feb. 13, 1940 |
| 2,199,388 | Bolesky | May 7, 1940 |
| 2,253,552 | Burch | Aug. 26, 1941 |
| 2,262,026 | Hastings | Nov. 11, 1941 |
| 2,266,537 | Elmer | Dec. 16, 1941 |
| 2,338,515 | Johns | Jan. 4, 1944 |
| 2,434,984 | Bolesky et al. | Jan. 27, 1948 |
| 2,543,040 | Mertler | Feb. 27, 1951 |